(12) United States Patent
Lee et al.

(10) Patent No.: US 6,583,190 B2
(45) Date of Patent: Jun. 24, 2003

(54) EXPANDABLE COMPOSITION, BLOWING AGENT, AND PROCESS FOR EXTRUDED THERMOPLASTIC FOAMS

(75) Inventors: Shau-Tarng Lee, Oakland, NJ (US); Natarajan S. Ramesh, Danbury, CT (US); James Baker, Scotia, NY (US)

(73) Assignee: Sealed Air Corporation (U.S.), Saddle Brook, NJ (US)

( * ) Notice: Subject to any disclaimer, the term of this patent is extended or adjusted under 35 U.S.C. 154(b) by 155 days.

(21) Appl. No.: 09/748,931

(22) Filed: Dec. 27, 2000

(65) Prior Publication Data

US 2002/0120022 A1 Aug. 29, 2002

(51) Int. Cl.⁷ .................................................. C08J 9/14
(52) U.S. Cl. ............................. 521/97; 521/79; 521/98; 521/142; 521/143
(58) Field of Search ........................... 521/97, 98, 142, 521/143, 79; 516/10

(56) References Cited

U.S. PATENT DOCUMENTS

| | | |
|---|---|---|
| 3,839,238 A | 10/1974 | Ealding |
| 4,464,484 A | 8/1984 | Yoshimura et al. |
| 5,034,171 A | 7/1991 | Kiczek et al. |
| 5,089,533 A | 2/1992 | Park |
| 5,149,579 A | 9/1992 | Park et al. |
| 5,225,451 A | 7/1993 | Rogers et al. |
| 5,348,984 A | 9/1994 | Lee |
| 5,462,974 A | * 10/1995 | Lee et al. |
| 5,554,661 A | 9/1996 | Chaudhary et al. |
| 5,585,058 A | 12/1996 | Kolosowski |
| 5,916,926 A | 6/1999 | Cooper et al. |
| 5,993,706 A | 11/1999 | Wilkes et al. |
| 6,030,696 A | 2/2000 | Lee |

FOREIGN PATENT DOCUMENTS

| | | |
|---|---|---|
| JP | 01 254742 A | 10/1989 |
| JP | 1-2544742 | 10/1989 |

* cited by examiner

Primary Examiner—Morton Foelak
(74) Attorney, Agent, or Firm—Alston & Bird LLP

(57) ABSTRACT

An extruded thin sheet foam is disclosed prepared from a polyolefin resin in which the blowing agent comprises a blend of from about 1 to 25% by weight of carbon dioxide and the balance of C3 to C4 VOCs. Thin foam sheets produced with the blowing agent age about twice as fast as foams prepared with VOCs, are remarkably stable, and can be produced at high throughputs.

21 Claims, No Drawings

EXPANDABLE COMPOSITION, BLOWING AGENT, AND PROCESS FOR EXTRUDED THERMOPLASTIC FOAMS

FIELD OF THE INVENTION

This invention relates to an expandable composition and blowing agent for producing low density thermoplastic foams and a process for producing an expanded thermoplastic foam product of low density using an expandable thermoplastic composition. In particular, this invention relates to use of a blended blowing agent for incorporating into a plasticized thermoplastic resin for foaming by extrusion.

BACKGROUND OF THE INVENTION

Thermoplastic foam products can be produced by a wide variety of processes, of which extrusion is but one, that are in part responsible for the wide variety of foam products available today. Foams range in consistency from rigid materials suitable for structural use to flexible substances for soft cushions and packaging materials. These foams range in cellular formation from open or interconnecting-cell foams to closed or unicell foams. The cell structure may range from large to fine. Electrical, thermal, mechanical, and chemical properties can be varied within wide limits depending on the thermoplastic resin composition and the method chosen to create the foam. Foamed thermoplastics range in density anywhere from about 10 kg/m³ to over 1,000 kg/m³, although the latter perhaps more properly are called microcellular structures. True foams are considered to have a density of less than about 800 kg/m³.

Many methods have been developed for the manufacture of foamed thermoplastics, which generally can be classified into three groups: 1) methods for adding a gaseous "blowing agent" to the thermoplastic during processing, 2) methods for producing a gaseous blowing agent in the thermoplastic during processing, and 3) methods for forming a thermoplastic mass from granules to obtain a cellular structure. Similar blowing agents sometimes are used in the various methods to produce foams. However, the effectiveness of a particular blowing agent varies considerably depending on the thermoplastic resin composition, the method chosen, the process conditions, the additives used, and the product sought.

Blowing agents work by expanding a thermoplastic resin to produce a cellular thermoplastic structure having far less density than the resin from which the foam is made. Bubbles of gas form around "nucleation sites" and are expanded by heat or reduced pressure or by a process of chemical reaction in which a gas is evolved. A nucleation site is a small particle or conglomerate of small particles that promotes the formation of a gas bubble in the resin. Additives may be incorporated into the resin to promote nucleation for a particular blowing agent and, consequently, a more uniform pore distribution. However, the foam is maintained by replacing the blowing agent in the cells with air. Diffusivity of the blowing agent out of the cells relative to air coming into the cells impacts the stability of the foam over time and whether the cells of the foam may collapse. Additives may be incorporated into the resin and process conditions may be adjusted to assist in controlling the diffusivity of the blowing agent, to promote foam stability, and to limit collapse of the foam to acceptable limits.

Methods for producing a blowing agent in situ usually involve a chemical reaction that evolves gas. Polyethylene, silicone, epoxy, and vinyl foams have all been produced by adding a substance that will produce a gaseous blowing agent chemically. For example, dinitroso compounds and hydrazides, which evolve nitrogen gas on decomposition, and bicarbonates, which evolve carbon dioxide, have been added to thermoplastic resins to produce foams.

Polystyrene foams often are produced by "bead molding," in which partially expanded granules or beads are heated in a mold in the presence of a blowing agent to expand and fuse the particles into a rigid unicellular structure. A volatile organic compound or some other gaseous blowing agent is impregnated into the beads. Heat is applied and the pressure is released to cause the beads to expand and fuse.

There are several methods for adding a blowing agent to a thermoplastic resin during processing to produce a foam. Ureaformaldehyde and polyvinylformaldehyde foams have been produced by whipping air into a heated thermoplastic mass before it sets. Polyolefinic foams have been produced by introducing air or some other gas or volatile solvent into a heated thermoplastic polyolefin mass and then heating the mass or reducing pressure to expand the gas and form pores of a desirable size. One more specific method is to impregnate a thermoplastic resin with blowing agent under heat and pressure in a closed vessel. The pressure is released to expand the blowing agent to form "prefoamed," or partially expanded, beads. Prefoamed beads usually are further expanded in an enclosed vessel such as a mold to produce a molded foam product, such as is discussed hereinabove.

Another more specific method, to which the invention claimed herein relates, is to mix the blowing agent with molten resin under pressure and then extrude the mixture through a forming die into a zone of reduced pressure. Shaped foams can be produced by extrusion foaming using a forming die of particular configuration. Plank, which can be cut to a desirable shape, and thin foam sheets are produced in this manner.

Extrusion foaming is a continuous process in which a plasticized thermoplastic resin is cooled and expanded when the resin and blowing agent are extruded into a zone of lower pressure. Mixing of blowing agent with polyethylene resin for extrusion foaming can take place in as little as few minutes or less because the resin is plasticized. Nucleating and stability control agents typically are used in extrusion foaming to control cell formation, diffusivity of the blowing agent, and stability of the foam.

Many of the halogenated hydrocarbons have been used for several years as blowing agents in the various methods for producing foams from thermoplastic resins. The halogenated hydrocarbons include the chlorofluorocarbons ("CFCs") and hydrochlorofluorocarbons ("HCFCs"). CFCs and HCFCs are readily impregnable in thermoplastic resins and are readily expandable under relatively mild conditions. CFCs and HCFCs generally produce foams of high quality with a minimum of processing difficulty. The pore size is controllable, the foam has good stability with minimum tendency to collapse after a period of time, and the surface characteristics of the foam are smooth and desirable. Also, CFCs, HCFCs, and other halogenated hydrocarbons typically are either not flammable or are of low flammability, which greatly reduces the care with which they may be used. These compounds have the further advantage of low toxicity. However, governmental regulation is phasing out use of halogenated hydrocarbons because the halogenated hydrocarbons may be responsible for damage to the earth's ozone layer.

Producers of thermoplastic foam products have been seeking alternatives to CFC and HCFC blowing agents for a number of years to reduce or eliminate altogether the amount of halogenated hydrocarbons used. A number of volatile organic compounds (VOCs) have been proposed, although many of these also are somewhat objectionable. VOCs include the light aliphatic hydrocarbons such as propane, n-butane, isobutane, butylene, isobutene, pentane, neopentane, and hexane, to name but a few. The diffusivity of VOCs can be many times faster than that of the halogenated hydrocarbons and harder to control. Foam collapse and stability problems have been encountered, although high quality foams can be produced using VOCs. Many VOCs are highly soluble in polyolefin resins and may be difficult or time-consuming to remove. VOCs typically are flammable, thus presenting handling problems and safety concerns.

Inert gases have also been proposed as blowing agents, although these sometimes do not provide acceptable results, especially for producing extruded foams. Inert gases include nitrogen, argon, xenon, krypton, helium, and carbon dioxide. Nitrogen and carbon dioxide, in particular, have the advantage of being inexpensive, readily available, and of not being flammable, and are not considered to be harmful to the earth's ozone layer. However, inert gases usually are not as readily soluble in thermoplastic resins as CFCs, HCFCs, and VOCs, are of higher volatility, and do not reduce the viscosity of the resin. Lubricants often are added to the resin for extrusion foaming. The range of processing conditions for producing acceptable products is narrower than for CFCs, HCFCs, and VOCs. Mixing the resin with an inert blowing agent and keeping the inert blowing agent in the resin is more complicated than for CFCs, HCFCs, and VOCs. The surface texture of extruded foams sometimes is rough. Extruded low density foams and thick foams are difficult to achieve. The foam sometimes has poor stability and foam shrinkage can be uncontrollable.

Some blowing agent blends of VOCs and inert gases have been proposed for use in preparing extruded polyolefin foams. For example, Ealding U.S. Pat. No. 3,839,238 discloses extruded polyolefin foams prepared with a blowing agent system of a first blowing agent of saturated or unsaturated hydrocarbons and halogenated hydrocarbons including, among others, pentane, hexane, heptane, and octane, and a second blowing agent of carbon dioxide, nitrogen, air, methane, ethane, propane, and others. Foam density is disclosed as 0.05 to 0.5 g/cc (50 to 500 kg/$M^3$), which is a relatively high density.

Lee U.S. Pat. No. 5,348,984 discloses a blowing agent blend for continuously extruded polyolefin foams of about 25 to 75% by weight carbon dioxide and about 75 to 25% hydrocarbon from the butanes and propane. Foam density is from about 20 to 40 kilograms per cubic meter (0.02 to 0.04 g/cc).

Lee U.S. Pat. No. 5,462,974 discloses a blowing agent blend for continuously extruded polyolefin foams of about 20 to 80% by weight carbon dioxide and about 80 to 20% hydrocarbon from the butanes and propane. Foam density is from 20 to 100 kg/$M^3$. Less carbon dioxide is said to be useful if ethane is included in the blend.

The blowing agent blends of inert gas and VOC have been useful, but normally demand relatively slow extrusion rates.

Alternative blowing agents for extruded thermoplastic foams, processes for producing extruded foams using blowing agents, and thermoplastic resin compositions containing blowing agents are desirable that provide improvements in the production and characteristics of continuously extruded polyolefin foams.

SUMMARY OF THE INVENTION

The invention claimed herein relates to the use of a blowing agent for continuous extrusion foaming of thin sheets of relatively low density polyolefin foams at relatively high extrusion throughputs, acceptable pore structure, and with short aging characteristics. This invention is based on the recognition that initial foam dimensional stability as the foam is produced at high throughput can be controlled by use of a particular blowing agent blend in which small amounts of carbon dioxide are incorporated into C-2, C-3, and C-4 VOCs. While not wishing to be bound by theory, it is believed that small amounts of carbon dioxide promote faster exchange of air with blowing agent. In many, but not all, instances, the foam initially collapses slightly and then recovers at least about 95% of its as-extruded density. Foams produced in accordance with the invention are remarkably dimensionally stable, expanding and contracting less and aging about twice as fast as quality foams produced with VOC blowing agents not containing carbon dioxide. These properties are significant in the aging of roll stock, reducing thickness variations in the machine direction of the foam that can result from tightness in the rolls as the aging foam expands, and reducing the hazards inherent in handling and processing flammable VOCs.

Extruded thin foam sheets of from about 0.01 to 0.5 inches thick and having a low density of from about 10 to 60 kilograms per cubic meter can be produced by practice of the invention at extrusion throughputs rates of from above about 100 kg/hr to 250 kg/hr. Throughputs of 200 kg/hr are typical, although the precise rate is somewhat machine dependent and not always readily quantifiable for general application. Throughputs of 300, 400, and even 500 kg/hr should be possible with larger extruders, which normally have not yet been used for thin sheets of extruded low density foams, but may be enabled by the practice of the invention recited herein.

The foams expand and contract less than about 10 to 15% of their original as-extruded dimensions. Typically, these foams are aged for shipment within three days, normally achieving well less than 50% of the lowest explosive limit in air for the particular VOC used.

The blowing agent is a blended agent of carbon dioxide in an amount of from 1 to 25% by weight or less of the blowing agent. The balance is a hydrocarbon selected from among ethane, normal butane, isobutane, propane, or a mixture of any two or all of these hydrocarbons. Carbon dioxide concentrations by weight of blowing agent of 10, 15, and 20% are useful in the practice of the invention.

In a more specific embodiment, extruded thin foam sheets of low density polyethylene of nominal thickness of 0.05 to 0.150 inches and a density of from 15 to 30 kg/$m^3$ are produced at the rate of from about 150 to 225 kg/hr using a blowing agent of propane or one of the butanes or mixtures thereof blended with carbon dioxide in an amount of from 10 to 20% by weight of the blowing agent. The foams are produced as roll stock and age as roll stock within 3 days to less than 30% of the lowest explosive limit in air for these VOCs. Dimensions of the foam during aging vary depending on the extrusion and aging conditions and the precise composition of the resin from which the foam is made. The foam may expand or contract, although usually less than for an all VOC blowing agent. Typically, if expanding, the foam may expand from the as-extruded dimensions by as little as 5% and typically by 8% or less. Tight roll conditions that may inhibit aging and can damage the foam through compression during storage are avoided.

Expandable resin compositions for producing extruded polyolefin foam products in accordance with the invention include a plasticized polyolefin resin mixed with a blended blowing agent as described. The expandable composition also normally contains a fatty ester aging or diffusivity modifier and a nucleation agent for controlling the size of the cells of the foam. Aging modifiers are thought to have a minimal impact on the diffusivity of carbon dioxide out of the cells of the foam. The presence of small amounts of carbon dioxide in the blowing agent, in accordance with the invention, tends to preclude tightness in the roll stock that is produced.

In more specific detail, the expandable composition may include a polyethylene resin, about 0.5 to 5 kilograms of glycerol monostearate per 100 kilograms of the resin, about 0.05 to 0.5 kilograms of zinc oxide per 100 kilograms of the resin, and about 1 to 20 kilograms of blowing agent per 100 kilograms of the resin, which blowing agent has a relatively low percentage of carbon dioxide mixed with either normal butane, isobutane, propane, or mixtures thereof.

Thus, a blowing agent of small amounts of $CO_2$ mixed with ethane, or normal- or iso-butane or propane is provided that is capable of producing extruded, low density thin foam sheets at high extrusion rates comparable to VOCs, but with less instability after expansion and faster aging characteristics.

DETAILED DESCRIPTION OF THE PREFERRED EMBODIMENTS

Various processes and equipment for extrusion foaming of thermoplastic resins have been used for many years. Generally, solid pellets of thermoplastic resin are fed through a hopper to a melting zone in which the resin is melted, or plasticized, to form a flowable thermoplastic mass. The plasticized thermoplastic mass generally is then metered to a mixing zone where the thermoplastic mass is thoroughly mixed with a blowing agent under pressure for subsequent cooling and expansion of the resin to form a foam. Blowing agent typically is injected between the metering and the mixing zones. The mixture of thermoplastic resin and blowing agent is then forced through a die, which imparts a shape to the thermoplastic mass, into a zone of lower pressure, such as atmospheric pressure. The blowing agent expands to form the cells of the foam and the thermoplastic foam is cooled.

Typical of much of the equipment used for extrusion of thermoplastic foams, the thermoplastic pellets are conveyed from a hopper through the melt zone, the mixing and cooling zones, and extruded through the die by a screw type apparatus. Single screw extruders are common, although double screw extruders sometimes are used for greater mixing.

When a blowing agent is injected into the mixing zone of the screw extruder, the blowing agent initially forms a dispersion of insoluble bubbles within the plasticized thermoplastic mass. These bubbles eventually dissolve in the thermoplastic mass as the mixing continues and the pressure increases down the length of the extruder. The extruder should have a length to diameter ratio of at least 30:1 and a sufficient length of mixing zone to ensure that proper mixing occurs.

Thermoplastic resins contemplated for use in the practice of the invention claimed herein include the polyolefin resins. Polyolefin resins may be defined as polymers derived from unsaturated hydrocarbons containing the ethylene or diene functional groups. Polyolefin resins may include virtually all of the addition polymers, however, the term polyolefin typically is used for polymers of ethylene, the alkyl derivatives of ethylene (the alpha-olefins), and the dienes. Among the more commercially important polyolefins are polyethylene, polypropylene, polybutene, and their copolymers. Polyethylene resins are particularly useful in the practice of the invention claimed herein.

Polyethylene is a whitish, translucent polymer of moderate strength and high toughness. Polyethylene is available in forms ranging in crystallinity from 50 to 95 percent. Polyethylene is available in low, medium, and high density polymer forms. For the low density material, the softening temperature is about 105° C. to 115° C. For the high density material the softening temperature is some 25° C. to 40° C. higher, or from about 130° C. to 140° C. Low, medium, and high density polyethylenes are suitable for extrusion foaming, including mixtures thereof.

The thermoplastic resin should be maintained at a temperature within a range above the melting point of the polymer that is sufficiently high so that the polymer has sufficient fluidity for mixing with blowing agent. This range normally will be from about 20° C. to 100° C. above the melting point of the resin. The melting zone can be maintained at a somewhat lower temperature due to the heat that is generated by friction as the plasticized resin flows through the extruder.

After mixing, the temperature of the mixture of resin and blowing agent should be lowered closer to the melting point of the mixture so that the polymer maintains its structure upon foaming, but not so much that complete expansion is hindered. The blowing agent has a plasticizing effect on the resin reducing its viscosity, or resistance to flow, and so the melting point of the mixture of resin and blowing agent normally is below that of the resin alone. The expansion temperature, which is above the melting point of the mixture, is empirically determined and depends upon the composition of the resin, the length of the screw, whether single or double screws are used, on the specific resin, upon the amount of blowing agent, and the specific blowing agent blend. For a low density polyethylene, the expansion temperature will generally be in the range of from about 85° C. to 120° C.

Additional general information on the production of polyolefin and other foams is available in the text *Foam Extrusion*, edited and contributed to by Shau-Tarng Lee, Ph.D, and published in July 2000 by Technomics, Lancaster, Pa., which is incorporated herein by reference in its entirety for the purpose of its general teachings.

The blowing agent contemplated for use in practicing the invention claimed herein comprises a mixture of carbon dioxide and either ethane, normal butane, isobutane, propane or mixtures of any two or all of these hydrocarbons. Carbon dioxide should be present in an amount by weight of the blowing agent of about 25% by weight or less. Mixtures of 1%, 10%, 15%, 20%, and 25% carbon dioxide by weight and the balance of either ethane, normal butane, isobutane, propane, or mixtures thereof are considered useful. The blowing agent is mixed into the plasticized polyethylene polymer resin in proportions to achieve the desired degree of expansion in the resulting foamed cellular product. Stable foam densities from about 60 kg/m³ down to as low as 10 to 20 kg/m³ may be made by practice of the invention and receive the benefits of faster aging and greater dimensionally stability for facilitating aging time. Typically, foams of from 20 to 25 kg/m³ are produced.

The blowing agent generally is mixed with the resin in a ratio of about one part blowing agent to ten parts resin. The maximum useful proportion of blowing agent in the plasticized resin is affected by the pressure that is maintained on the resin in the extrusion die passage.

The benefits of using the blowing agent blend of the invention claimed herein may be enhanced by using a combination of a nucleation agent and an aging modifier to control cell size and development and to control the replacement of blowing agent with air in the cells of the foam, respectively. In particular, it has been found that a combination of low levels of zinc oxide nucleation agent and glycerol monostearate aging modifier is useful to further reduce the density of the foams produced and results in a thickness increase.

The glycerol monostearate is mixed with the polyethylene resin prior to melting in an amount sufficient to produce a desirable rate of exchange of air with blowing agent in the cells of the foam. More specifically, the glycerol monostearate is mixed with the polyethylene resin prior to melting in an amount from about 0.5 to 5 kg per 100 kg of polyolefin resin. Still more specifically, glycerol monostearate is added in an amount of 1 kg per 100 kg of polyolefin resin.

Zinc oxide nucleation agent is mixed with the resin in an amount sufficient to promote nucleation and to develop a pore structure of the desired size. More specifically, zinc oxide nucleation agent is mixed with the resin in an amount of from about 0.05 to 0.5 kg per 100 kg of polyolefin resin. Still more specifically, zinc oxide is added to the resin in an amount of 0.1 kg per 100 kg of polyolefin resin.

The foam is produced by continuously extruding the plasticized resin and blowing agent mixture through a forming die and then rolling the foam sheet into a roll for storage and aging. Extrusion rates in accordance with the invention are above 100 kg/hr. Generally, rates of 150 to 225 kg/hr are typical, but rates of 300 to 500 kg/hr can be achieved with large extruder diameters.

Aging is accomplished as the blowing agent gradually diffuses out of the cells of the foam and is replaced by air. Generally speaking, if a blowing agent escapes too fast at a high temperature, then the foam may collapse and may not recover. If a flammable blowing agent does not escape fast enough, then the foam may require an uneconomical aging period or may pose a hazard, especially if stored in a confined area, such as a truck trailer.

Aging of foams is often expressed as a percentage of the lowest explosive limit in air for the compound of interest. The lowest explosive limit, or "LEL" is that lowest limit at which a concentration of a particular VOC is explosive in air on application of a spark. The highest explosive limit is similar. However, at levels above the highest explosive limit, the danger of fire or explosion is reduced since the concentration of oxygenated air is reduced by the amount of hydrocarbon and the danger of explosive ignition is therefor also reduced. Normally, it is desirable to achieve no more than 70 to 80% of the LEL for a particular VOC prior to shipment of a foam. Preferably, the foam is aged to less than 50% of the LEL for the blowing agent. Propane foams typically take about 6 days to age properly.

The following Tables 1 through 3 compare the results achieved using examples of blowing agent according to the invention to examples based on a blowing agent of 100% propane for production of thin sheets of extruded low density polyethylene foam, as set forth above. In each of Tables 1 through 3, the foam sheet is measured in the thickness dimension in inches at the time the foam is produced and thereafter at the time intervals indicated.

As can be seen in Table 1, the samples produced with 100% propane blowing agent increased in thickness from the time they were first extruded by about 17% to their maximum dimension. In contrast, the foam produced with about 15% $CO_2$ in the blowing agent by weight increased in thickness by less than 8%. Tables 2 and 3 show similar results for a foam produced from 100% propane. However, the foams produced with a blowing agent having 20% $CO_2$ in the blend (Table 2) and having 15% $CO_2$ and 25% $CO_2$ in the blend (both in Table 3) initially collapsed a small degree of from about 1% (Table 3) to as much as 14% (Table 2), but then recovered their volume. Collapse normally is not considered desirable, but these foams recover, are of good quality, age quickly, and avoid producing tight roll stock that can block the pathway for exchange of air and VOC and can damage the roll stock. Too tight a roll compresses the inner layers and can result in machine direction thickness variations.

The foam produced with 100% propane blowing agent expands sufficiently to impact the path for exchange of blowing agent with air. In contrast, the roll stock produced in accordance with the invention remains sufficiently loose to promote exchange of blowing agent with air, which increases the speed by which the foam can be aged.

TABLE 1

| Blowing Agent | 100% Propane | | 85% Propane/15% $CO_2$ | |
|---|---|---|---|---|
| Sample | 1 | 2 | 3 | 4 |
| Hot initial foam thickness, inches | .053 | .058 | .064 | .056 |
| 1 minute | .055 | .060 | .064 | .056 |
| 2 | .056 | .061 | .064 | .056 |
| 3 | .056 | .061 | .065 | .056 |
| 4 | .057 | .062 | .065 | .056 |
| 5 | .057 | .063 | .065 | .056 |
| 10 | .059 | .065 | .065 | .056 |
| Every 15 minutes | .060 | .066 | .067 | .058 |
| 30 | .062 | .068 | .068 | .059 |
| 45 | .060 | .068 | .068 | .057 |
| 1 hour | .060 | .067 | .069 | .056 |
| 1:15 | .060 | .067 | .066 | .056 |
| 1:30 | .058 | .066 | .066 | .055 |
| 1:45 | .058 | .067 | .065 | .055 |
| 2 hours | .057 | .067 | .064 | .052 |
| 2:15 | .057 | .066 | .064 | .053 |
| 2:30 | .056 | .066 | .062 | .053 |
| 2:45 | .055 | .064 | .062 | .052 |
| 3 hours | .054 | .063 | .061 | .053 |
| 3:15 | .054 | .063 | .061 | .052 |
| 3:30 | .055 | .063 | .060 | .051 |
| 3:45 | .053 | .062 | .060 | .051 |
| 4 hours | .055 | .060 | .061 | .052 |
| 4:15 | .052 | .059 | .060 | .052 |
| 4:30 | | | .059 | .052 |
| 4:45 | | | .060 | .053 |

TABLE 2

| Blowing Agent | 100% Propane | | 80% Propane/20% $CO_2$ | |
|---|---|---|---|---|
| Sample | 1 | 2 | 3 | 4 |
| 1 minute thickness, inches | .132 | .127 | .128 | .129 |
| 2 | .135 | .129 | .123 | .126 |
| 3 | .137 | .131 | .122 | .125 |
| 4 | .138 | .134 | .120 | .124 |
| 5 | .140 | .136 | .119 | .122 |
| 10 | .143 | .138 | .117 | .120 |
| Every 15 minutes | .145 | .140 | .113 | .117 |
| 30 | .145 | .140 | .110 | .115 |
| 45 | .148 | .143 | .112 | .114 |
| 1 hour | .147 | .141 | .117 | .116 |

TABLE 2-continued

| Blowing Agent | 100% Propane | | 80% Propane/20% CO$_2$ | |
|---|---|---|---|---|
| Sample | 1 | 2 | 3 | 4 |
| 1:15 | .146 | .142 | .123 | .121 |
| 1:30 | .146 | .140 | .123 | .123 |
| 1:45 | .148 | .145 | .124 | .123 |
| 2 hours | .147 | .141 | .130 | .127 |

TABLE 3

| Blowing Agent Sample | 100% Propane | 85% propane/ 15% CO$_2$ | 75% Propane/ 25% CO$_2$ |
|---|---|---|---|
| Hot Initial Thickness, inches | .128 | .131 | .130 |
| 1 minute | .127 | .130 | .128 |
| 2 | .126 | .129 | .126 |
| 3 | .126 | .128 | .124 |
| 4 | .126 | .128 | .123 |
| 5 | .126 | .129 | .122 |
| 10 | .130 | .130 | .121 |
| 15 | .133 | .131 | .120 |

Table 4, below, shows the aging characteristics for the foam of the invention compared to foams produced with a 100% propane blowing agent. The data for foam produced with 100% propane blowing agent was obtained after 6 days. The data for the foam produced with 15% CO$_2$ in the blowing agent (the remainder was propane) could be obtained after only 3 days.

Rolls of freshly extruded foam roll stock produced with each of the blowing agents were placed in separate closed trailers for storage and aging. Temperature, wind, and humidity conditions were monitored. The readings were obtained from the center of the trailer about 6 inches off the bottom, since the VOCs are heavier than air and tend to become concentrated there. The numbers shown are for the percentage of the lowest explosive limit reached at each particular time. Generally, it is desirable to be below about 70% of the lowest explosive limit of a VOC in air.

In all cases, the foams produced with blowing agent of the invention showed comparable aging in half the time of foams produced with a 100% propane blowing agent.

TABLE 4

| Time inside trailer | 3 Day CO$_2$ | 6 Day Propane |
|---|---|---|
| Day 1-8:00 am | 5% | 4% |
| Day 1-4:00 pm | 6% | 5% |
| Day 2-8:00 am | 2% | 2% |
| Day 2-4:00 pm | 7% | 4% |
| Day 2-12:00 am | 6% | 3% |
| Day 3-9:30 am | 1% | 4% |
| Day 5-8:30 am | — | 1% |
| Day 5-5:30 pm | 2% | 2% |
| Day 5-12:35 am | — | 1% |
| Day 6-7:30 am | — | 1% |
| Day 6-5:00 pm | — | 1% |
| Day 6-12:40 am | 1% | — |
| Day 7-8:00 am | — | 1% |

The invention has been described in particular embodiments. These embodiments should be considered illustrative of and not in limitation of the invention described herein. The full scope of the invention should be judged in accordance with the appended claims and equivalents thereto.

What is claimed is:

1. A process for producing an extruded, low density polyolefin foam product, said process comprising the steps of:
   a) mixing a blowing agent with a plasticized polyolefin resin including a fatty ester based aging modifier, the blowing agent comprising a blend of carbon dioxide and a hydrocarbon selected from among the group consisting of ethane, n-butane, isobutane, propane, and mixtures thereof, wherein said carbon dioxide is present in an amount of from about 1 to 25% by weight of the blowing agent;
   b) extruding the mixture of resin and blowing agent at a rate of from about 150 kg/hr to 500 kg/hr; and
   c) expanding the mixture so as to produce a dimensionally stable foam sheet product of thickness less than 0.5 inches.

2. The process of claim 1 further comprising the step of aging the foam to reduce the concentration of blowing agent in the foam to less than 50% of the lowest explosive limit within 3 days.

3. The process of claim 1 wherein the extrusion rate is from 200 to 400 kg/hr.

4. A process for producing an expanded polyethylene foam product, said process comprising the steps of:
   a) mixing a blowing agent comprising from about 1 to 20% by weight of carbon dioxide and the balance a hydrocarbon selected from among the group consisting of ethane, n-butane, isobutane, propane, and mixtures thereof with a plasticized polyethylene resin, an aging modifier, and a nucleation agent in the melting zone of an extruder;
   b) extruding the mixture of blowing agent and resin through the orifice of the extruder agent at a rate of from about 150 kg/hr to 500 kg/hr; and
   c) expanding the mixture so as to produce a dimensionally stable foam sheet product of thickness less than 0.200 inches and density of from 10 to 60 kg/m$^3$.

5. The process of claim 1 wherein carbon dioxide is present in an amount of about 1 percent by weight of the blowing agent.

6. The process of claim 1 wherein carbon dioxide is present in an amount of about 10 percent by weight of the blowing agent.

7. The process of claim 1 wherein carbon dioxide is present in an amount of about 15 percent by weight of the blowing agent.

8. The process of claim 1 wherein carbon dioxide is present in an amount of about 20 percent by weight of the blowing agent.

9. The process of claim 4 wherein the extrusion rate is from 200 to 400 kg/hr.

10. A process for producing an extruded, low density polyolefin foam product, said process comprising the steps of:
   a) mixing a blowing agent with a plasticized polyolefin resin including a fatty ester based aging modifier, the blowing agent comprising a blend of carbon dioxide and a hydrocarbon selected from among the group consisting of ethane, n-butane, isobutane, propane, and mixtures thereof, wherein said carbon dioxide is present in an amount of from about 1 to 25% by weight of the blowing agent;
   b) extruding the mixture of resin and blowing agent at a rate of from about 150 kg/hr kg/hr to about 500 kg/hr;
   c) expanding the mixture so as to produce a dimensionally stable foam sheet product of thickness less than 0.5 inches; and d) aging the foam to reduce the concentration of blowing agent in the foam to less than 50 percent of the lowest explosive limit within three days.

11. A process for producing an extruded, low density polyolefin foam product, said process comprising the steps of:
   a) mixing a blowing agent wit a plasticized polyolefin resin including a fatty ester based aging modifier, the blowing agent comprising a blend of carbon dioxide and a hydrocarbon selected from among the group consisting of ethane, n-butane, isobutane, propane, and mixtures thereof, wherein said carbon dioxide is present in an amount of from about 1 to 25% by weight of the blowing agent;
   b) extruding the mixture of resin and blowing agent at a rate of from about 150 kg/hr to about 500 kg/hr;
   c) expanding the mixture so as to produce a dimensionally stable foam sheet product of thickness less than 0.5 inches; and
   d) aging the foam to reduce the concentration of blowing agent in the foam to less than 80 percent of the lowest explosive limit within three days.

12. The process of claim 11 wherein the concentration of blowing agent is less than 70 percent of the lowest explosive limit.

13. The process of claim 11 wherein the concentration of blowing agent is less than 50 percent of the lowest explosive limit.

14. The process of claim 11 wherein the concentration of blowing agent is less than 30 percent of the lowest explosive limit.

15. The process of claim 1 wherein the foam sheet has a thickness from 0.01 inches to 0.5 inches.

16. The process of claim 15 wherein the foam sheet has a thickness from 0.05 inches to 0.150 inches.

17. The process of claim 4 wherein the foam sheet has a thickness from 0.05 inches to 0.150 inches.

18. The process of claim 10 wherein the foam sheet has a thickness from 0.01 inches to 0.5 inches.

19. The process of claim 18 wherein the foam sheet has a thickness from 0.05 inches to 0.150 inches.

20. The process of claim 11 wherein the foam sheet has a thickness from 0.01 inches to 0.5 inches.

21. The process of claim 20 wherein the foam sheet has a thickness from 0.05 inches to 0.150 inches.

* * * * *